(12) United States Patent
Fujikawa

(10) Patent No.: US 8,760,766 B2
(45) Date of Patent: Jun. 24, 2014

(54) HEAD-UP DISPLAY APPARATUS

(75) Inventor: Takayuki Fujikawa, Nagoya (JP)

(73) Assignee: Denson Corporation, Kariya (JP)

( * ) Notice: Subject to any disclaimer, the term of this patent is extended or adjusted under 35 U.S.C. 154(b) by 64 days.

(21) Appl. No.: 13/593,600

(22) Filed: Aug. 24, 2012

(65) Prior Publication Data

US 2013/0050834 A1 Feb. 28, 2013

(30) Foreign Application Priority Data

Aug. 27, 2011 (JP) .................................. 2011-185380

(51) Int. Cl.
*G02B 27/01* (2006.01)

(52) U.S. Cl.
USPC ......................................................... 359/630

(58) Field of Classification Search
USPC ..................................... 359/630, 563; 353/28
See application file for complete search history.

(56) References Cited

U.S. PATENT DOCUMENTS

| | | | |
|---|---|---|---|
| 5,440,428 A * | 8/1995 | Hegg et al. .................... | 359/630 |
| 2012/0250306 A1 | 10/2012 | Sugiyama et al. | |

FOREIGN PATENT DOCUMENTS

| | | |
|---|---|---|
| JP | 7-270711 | 10/1995 |
| JP | 11-295817 | 10/1999 |
| JP | 2002-236201 | 8/2002 |
| JP | 2003-029344 | 1/2003 |
| JP | 2010-145746 | 7/2010 |
| WO | 2011/074209 | 6/2011 |

OTHER PUBLICATIONS

U.S. Appl. No. 13/593,615, filed Aug. 24, 2012, Takayuki Fujikawa et al.

* cited by examiner

*Primary Examiner* — Joseph P Martinez

(74) *Attorney, Agent, or Firm* — Harness, Dickey & Pierce, PLC

(57) ABSTRACT

A screen member has a plurality of optical elements, each of which includes a primary curved surface and two secondary curved surface. The primary curved surface diffuses a bundle of rays of light toward a main-viewing range through a display member. Each secondary curved surface diffuses the bundle of rays of light toward a corresponding sub-viewing range through the display member. A radius of curvature of the primary curved surface is larger than a radius of curvature of the secondary curved surface.

5 Claims, 10 Drawing Sheets

HEAD-UP DISPLAY APPARATUS

CROSS REFERENCE TO RELATED APPLICATION

This application is based on and incorporates herein by reference Japanese Patent Application No. 2011-185380 filed on Aug. 27, 2011.

TECHNICAL FIELD

The present disclosure relates to a head-up display apparatus.

BACKGROUND

For example, JPH07-270711A teaches a head-up display apparatus, in which a bundle of rays of light is diffused by a screen member, and the bundle of rays of light, which is diffused by the screen member is projected as a display image onto a display member to enable a viewer to see a virtual image of the display image.

The screen member of the head-up display apparatus of JPH07-270711A is an optical member, in which a plurality of micro-optical elements is arranged in a grid pattern to transmit or reflect a bundle of rays of light that is incident on the respective micro-optical elements. The micro-optical elements are generally referred to as micro-lenses or micro-mirrors, and each of the micro-lenses or micro-mirrors is configured into a rectangular form in a view taken in a direction perpendicular to a plane of the screen member. These micro-lenses or micro-mirrors are arranged in the grid pattern to form a micro-lens array or a micro-mirror array. A surface of each of the micro-lenses or micro mirrors is formed as a curved surface having a predetermined radius of curvature to diffuse the bundle of rays of light, which is incident onto the curved surface, at a predetermined angle of diffusion. Therefore, the bundle of rays of light, which is outputted from the screen member at the predetermined angle of diffusion and is projected onto the display member, is guided to a predetermined range that is set around eyes of the viewer. Thereby, even when the eyes of the viewer are moved in the predetermine range in the vertical direction and the horizontal direction of the vehicle, the viewer can visually recognize the virtual image of the display image. This predetermined range is generally referred to as an eye box, JPH07-270711A further teaches adjustment of a width and a height of each of the micro-lenses or micro-mirrors. Specifically, JPH07-270711A teaches adjustment of a size of the eye box by adjusting pitches of the micro-lenses or micro-mirrors in the direction of the width and the direction of the height of each of the micro-lenses or micro-mirrors.

In the head-up display apparatus, in order to enable the viewer to visually recognize the virtual image of the display image even in a case where the viewer largely moves his/her head to check, for instance, his/her surrounding at the time driving the vehicle, it may be desirable to form sub-eye boxes next to the eye box, in which the virtual image can be visually recognized by the viewer. The sub-eye box is a range, in which the virtual image is visually recognizable with the minimum brightness. In the following discussion, the eye box, which is formed next to the sub-eye box, is referred to as a main eye box.

However, when pitches of the micro-lenses or micro-mirrors in the direction of the width and the direction of the height are adjusted to enable the visual recognition of the virtual image in the sub-eye box, the bundle of rays of light, which impinges on the screen member, is uniformly guided to both of the main eye box and the sub-eye boxes. This is considered to be a result of a uniform setting of a radius of curvature of the curved surface of the respective micro-lenses or micro-mirrors.

When the viewing range is formed in the above-described manner, the energy of the bundle of rays of light, which is incident on the screen member, is also supplied to the sub-eye boxes. Therefore, the quantity of light in the main eye box is reduced in comparison to the case where only the main eye box is set as the viewing range, and thereby the brightness of the virtual image, which is viewed in the main eye box, is reduced in comparison to the case where only the main eye box is set as the viewing range. Furthermore, the quantity of light in the sub-eye box becomes substantially equal to the quantity of light in the main eye box. Therefore, the quantity of light in the sub-eye box is excessively increased, and thereby the brightness of the virtual image in the sub-eye box is excessively increased. As a result, the use efficiency of the bundle of rays of light is disadvantageously deteriorated.

SUMMARY

The present disclosure is made in view of the above disadvantage.

According to the present disclosure, there is provided a head-up display apparatus that is configured to project a display image onto a projection surface of a display member, which is installed in a vehicle, to enable a viewer located in a vehicle cabin (e.g., a passenger compartment) of the vehicle to view a virtual image of the display image. The head-up display apparatus includes a projector and a screen member. The projector is configured to project a bundle of rays of light, which forms the display image. The bundle of rays of light is projected from the projector onto the screen member. The screen member diffuses the bundle of rays of light, which is projected from the projector, at a predetermined angle of diffusion directly or indirectly toward the display member to guide the bundle of rays of light to both of a main-viewing range and at least one sub-viewing range, which are preset and in each of which the virtual image is visually recognizable by the viewer. The screen member has a plurality of optical elements, each of which includes a primary curved surface and at least one secondary curved surface. The primary curved surface of each of the plurality of optical elements diffuses the bundle of rays of light toward the main-viewing range through the display member. The at least one secondary curved surface of each of the plurality of optical elements diffuses the bundle of rays of light toward the at least one sub-viewing range through the display member. A radius of curvature of the primary curved surface of each of the plurality of optical elements is larger than a radius of curvature of the at least one secondary curved surface of the optical element.

BRIEF DESCRIPTION OF THE DRAWINGS

The drawings described herein are for illustration purposes only and are not intended to limit the scope of the present disclosure in any way.

DETAILED DESCRIPTION

Figure 1:
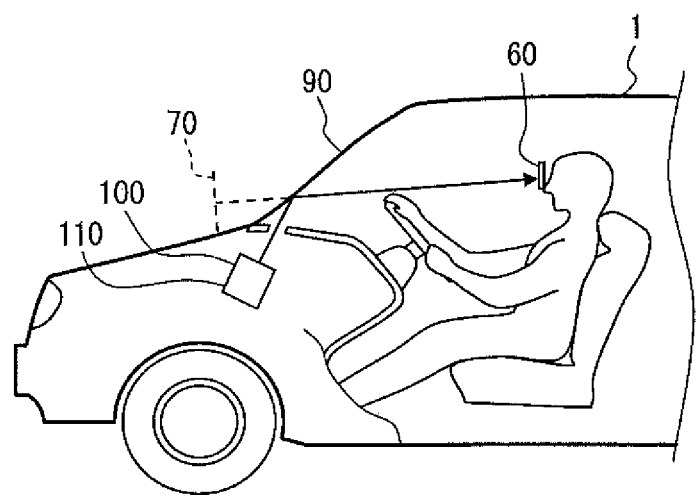
FIG. 1 is a schematic view showing a vehicle, in which a head-up display apparatus according to a first embodiment of the present disclosure is installed.

Various embodiments of the present disclosure will be described with reference to the accompanying drawings. In the following description, similar components will be indicated by the same reference numerals throughout the embodiments and will not be described redundantly for the sake of simplicity.

(First Embodiment)

Figure 2:
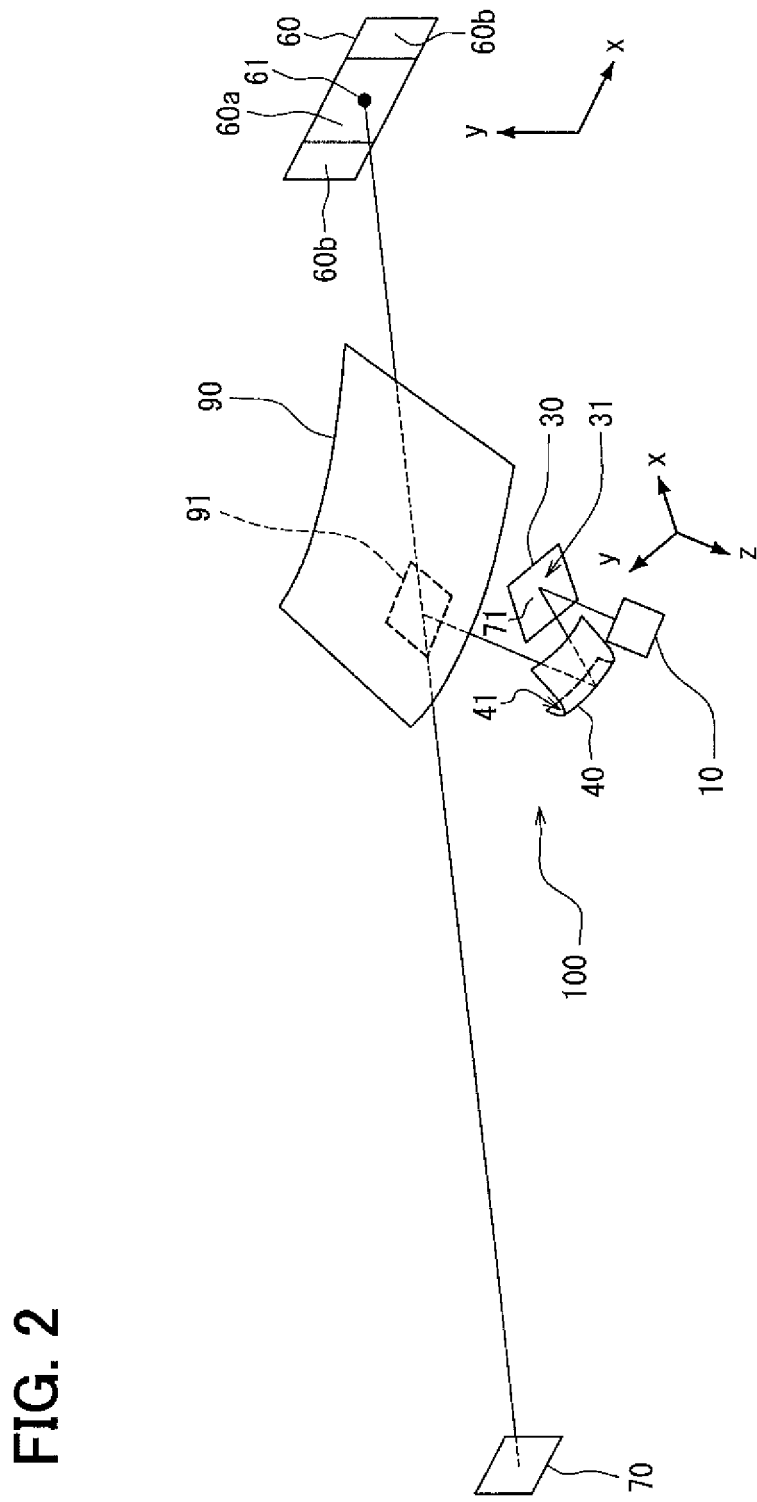
FIG. 2 is a diagram showing an arrangement of the head-up display apparatus of the first embodiment in the vehicle.
Figure 3:
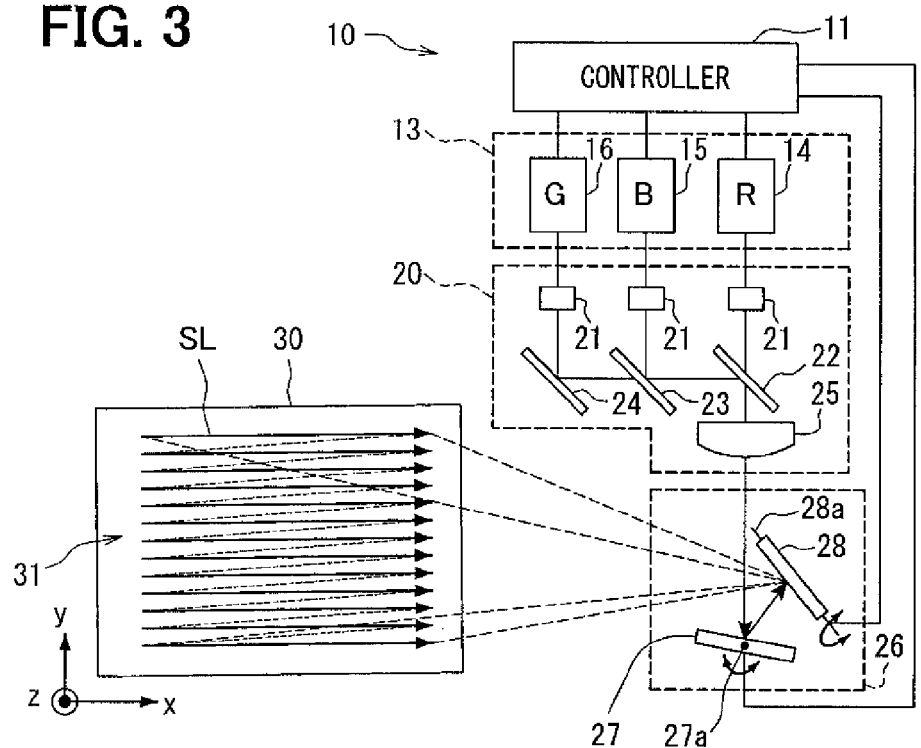
FIG. 3 is a diagram showing a structure of a laser scanner of the head-up display apparatus of the first embodiment.
Figure 4:
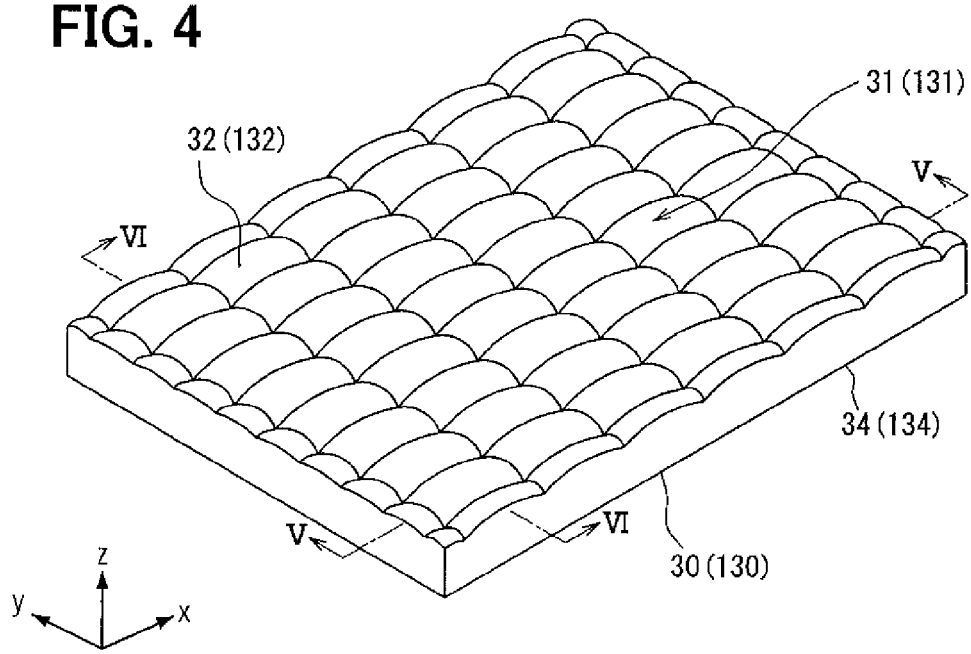
FIG. 4 is a perspective view of a screen member of the head-up display apparatus of the first embodiment.

FIG. 1 is a schematic view showing a vehicle, in which a head-up display apparatus of a first embodiment of the present disclosure is installed. FIG. 2 is a diagram for describing arrangement of the head-up display apparatus in the vehicle according to the first embodiment. FIG. 3 is a diagram for describing a structure and an operation of a laser scanner of the first embodiment. FIG. 4 is a perspective view of a screen member of the head-up display apparatus of the first embodiment.

The head-up display apparatus 100 of the first embodiment is received in an instrument panel of the vehicle 1. In the head-up display apparatus 100, a display image 71 is projected onto a display member, such as a windshield 90 of the vehicle 1, so that a viewer (driver) can visually recognize a virtual image 70 of the display image 71 from a preset main eye box 60a and two preset sub-eye boxes 60b in a preset box 60. A projection surface (also referred to as a surface of projection) 91, onto which the display image 71 is projected from the head-up display apparatus 100, is formed in a vehicle interior side surface of the windshield 90 and is formed as a concave surface, which is concave, i.e., is curved and is recessed in a direction away from the viewer. A bundle of rays of light, which forms the display image 71 and is projected onto the projection surface 91, is reflected by the projection surface 91 toward the main eye box 60a and the sub-eye boxes 60b. The viewer who perceives the light of the display image 71 can visually recognize, i.e., can view the virtual image 70 of the display image 71, which is formed on the front side of the windshield 90 (i.e., the side of the windshield 90, which is opposite from the viewer). The display image 71 includes image segments indicating, for example, a traveling speed of the vehicle 1 having the head-up display apparatus 100, an image of a traveling direction sign of the vehicle 1, which is specified by the navigation system, and a warning sign(s) of the vehicle 1.

The viewer can visually recognize the virtual image 70 only when the eye point 61 of the viewer is located in one of the main eye box 60a and the sub-eye boxes 60b. When the eye point 61 is displaced from all of the boxes 60a, 60b, it is difficult for the viewer to visually recognize the virtual image 70.

The main eye box 60a is an area, in which the eye point 61 is likely placed with a high possibility when the viewer is seated on the driver's seat and takes a proper driving posture on the driver's seat. The main eye box 60a is configured into an elongated rectangular form, which is elongated in the horizontal direction rather than in the vertical direction. The reason why the main eye box 60a is set to be elongated in the horizontal direction is that the head of the viewer seated on the driver's seat tends to move in the horizontal direction of the vehicle rather than the vertical direction of the vehicle. The two sub-eye boxes 60b are provided on two sides, respectively, of the main eye box 60a in the horizontal direction. A brightness (also referred to as a light intensity) of the virtual image 70 seen in the respective sub-eye boxes 60b is lower than a brightness of the virtual image 70 seen in the main eye box 60a for the viewer. However, the viewer who has his/her eye point 61 in the sub-eye box 60b can still visually recognize the virtual image 70.

Now, a structure of the head-up display apparatus 100 will be described with reference to FIGS. 1 to 4. The head-up display apparatus 100 includes a laser scanner 10, a screen member (also simply referred to as a screen) 30 and a concave mirror 40, which are received in a housing 110. In the following description, an axis of the horizontal direction (also referred to as a lateral direction or a first direction) of the virtual image 70, which is viewed by the viewer, will be referred to as an x-axis. Furthermore, an axis of the vertical direction (also referred to as a top-to-bottom direction or a second direction) of the virtual image 70, which is perpendicular to the horizontal direction, will be referred to as a y-axis. Also, in the following description, for the sake of convenience, the direction of the x-axis of the display image 71, which is formed on or projected onto each corresponding component, will be referred to as the horizontal direction (also referred to as the lateral direction or the first direction), and the direction of the y-axis of the display image 71, which is formed on or projected onto each corresponding component, will be referred to as the vertical direction (also referred to as the top-to-bottom direction or the second direction).

The laser scanner 10 includes a light source 13, an optical device 20, a micro electro mechanical systems (MEMS) device 26 and a controller 11.

The light source 13 includes three laser projecting devices 14-16. Each of the laser projecting devices 14-16 has a laser light source, which is, for example, a semiconductor laser (laser diode). Furthermore, each of the laser projecting devices 14-16 projects a corresponding laser light (also referred to as a laser beam) that has a frequency, which is different from that of the other two of the laser projecting devices 14-16, i.e., the corresponding laser light that has a color phase, which is different from that of the other two of the laser projecting devices 14-16. Specifically, the laser projecting device 14 projects the laser light of a red color. The laser projecting device 15 projects the laser light of a blue color. The laser projecting device 16 projects the laser light of a green color. When the laser lights of the different color phases are additively mixed, various colors can be reproduced. Each laser projecting device 14-16 is connected to the controller 11. Each laser projecting device 14-16 projects the laser light of the corresponding color phase based on a control signal outputted from the controller 11.

The optical device 20 includes three collimator lenses 21, three dichroic filters 22-24 and a condenser lens 25. Each collimator lens 21 is placed on a downstream side of the corresponding laser projecting device 14-16 in the projecting direction of the laser light, which is projected from the laser projecting device 14-16. The collimator lens 21 generates parallel rays of light by bending the laser light.

Each dichroic filter 22-24 is placed on a downstream side of the corresponding collimator lens 21 in the projecting direction of the laser light, which is projected from the corresponding laser projecting device 14-16. The dichroic filter 22, which is placed on the downstream side of the laser projecting device 14, passes the light of the frequency of the red color and reflects the other lights of the other frequencies that are other than the frequency of the red color. The dichroic filter 23, which is placed on the downstream side of the laser projecting device 15, reflects the light of the frequency of the blue color and passes the other lights of the other frequencies that are other than the frequency of the blue color. The dichroic filter 24, which is placed on the downstream side of the laser projecting device 16, reflects the light of the frequency of the green color and passes the other lights of the other frequencies that are other than the frequency of the green color. The green laser light, which is reflected by the dichroic filter 24, and the blue laser light, which is reflected by the dichroic filter 23, are reflected by the dichroic filter 22 and enter the condenser lens 25, and the red laser light, which passes through the dichroic filter 22, is also directed toward the condenser lens 25 and enters the condenser lens 25.

The condenser lens 25 is a plano-convex lens, which has a light input surface formed as a planar surface and a light output surface formed as a convex surface. The condenser lens 25 converges the light by bending the laser light, which enters the light input surface of the condenser lens 25. Thereby, the laser light, which has passed through the condenser lens 25, is focused on an imaging surface (also referred to as an arrayed surface or a first side surface) 31 of the screen member 30, which is opposite from a flat surface (also referred to as a second side surface) 34 of the screen member 30, after passing through the MEMS device 26.

The MEMS device 26 is connected to the controller 11 and includes a horizontal scanner 27 and a vertical scanner 28. A metal film is formed on a surface of the horizontal scanner 27, which is opposed to the optical device 20, by vapor deposition of, for example, aluminum to reflect the light. The horizontal scanner 27 is rotatably supported by a rotatable shaft 27a, which extends in the vertical direction, so that the horizontal scanner 27 is rotatable about a rotational axis of the rotatable shaft 27a. The rotatable shaft 27a is rotatably supported by the housing of the laser scanner 10. A drive device is provided to the MEMS device 26 to rotate the rotatable shaft 27a. The drive device drives the rotatable shaft 27a to rotate the same about the rotational axis and thereby to rotate the horizontal scanner 27 based on a drive signal that is outputted from the controller 11.

A metal film is formed on a surface of the vertical scanner 28, which is opposed to the horizontal scanner 27, by vapor deposition of, for example, aluminum to reflect the light. The vertical scanner 28 is rotatably supported by a rotatable shaft 28a, which extends in the horizontal direction, so that the vertical scanner 28 is rotatable about a rotational axis of the rotatable shaft 28a. The rotatable shaft 28a is rotatably supported by the housing of the laser scanner 10. A drive device is provided to the MEMS device 26 to rotate the rotatable shaft 28a. The drive device drives the rotatable shaft 28a to rotate the same about the rotational axis and thereby to rotate the vertical scanner 28 based on a drive signal that is outputted from the controller 11.

With the above-described structure of the MEMS device 26, the horizontal scanner 27 and the vertical scanner 28 are driven based on the drive signals outputted from the controller 11. Thereby, the horizontal scanner 27 is rotated about the rotational axis of the rotatable shaft 27a, and the vertical scanner 28 is rotated about the rotational axis of the rotatable shaft 28a.

The controller 11 is a control device, which includes a processor. The controller 11 outputs the control signal to each laser projecting device 14-16 to blink the laser light like a pulsed light. In addition, the laser controller 11 outputs the drive signals to the MEMS device 26 to control the direction of the reflected laser light, which is reflected by the horizontal scanner 27 and the vertical scanner 28, such that the reflected laser light, which is reflected by the horizontal scanner 27 and the vertical scanner 28, forms a scanning line SL shown in FIG. 3.

The controller 11 controls the laser scanner 10 such that the laser scanner 10 projects the light (bundle of rays), which forms the display image 71 on the imaging surface 31 of the screen member 30. Specifically, by scanning the projected blinking laser light, the display image 71, each pixel of which is formed by the corresponding blinking laser light, is formed on the imaging surface 31 of the screen member 30. The display image 71, which is formed by the scanning of the laser scanner 10, is an image that has, for example, 60 frames per second and 480 pixels in the horizontal direction (the x-axis) and 240 pixels in the vertical direction (the y-axis).

The screen member 30 is a reflective screen member (a screen member of a reflective type), which is formed by, vapor deposition of, for example, aluminum on a corresponding surface of a substrate made of, for example, glass. The screen member 30 diffuses and reflects a bundle of rays of the received light at a predetermined angle. The screen member 30 is placed on the upper side of the laser scanner 10 in the vertical direction of the vehicle 1 (see FIG. 2). The screen member 30 has the imaging surface 31. The imaging surface 31 is formed by a metal film of, for example, aluminum that is vapor deposited on the screen member 30. The display image 71 is formed on the imaging surface 31 when the laser light is projected from the laser scanner 10 along a y-z plane, which is defined by the y-axis and a z-axis (see FIGS. 3 and 4). The imaging surface 31 has a plurality of optical elements 32 to diffuse the laser light, which is projected onto the imaging surface 31. The imaging surface 31 diffuses the bundle of rays of the laser light, which forms the display image 71 and impinges on the imaging surface 31, and the diffused bundle of rays of the laser light is reflected toward the concave mirror 40.

Figure 5:
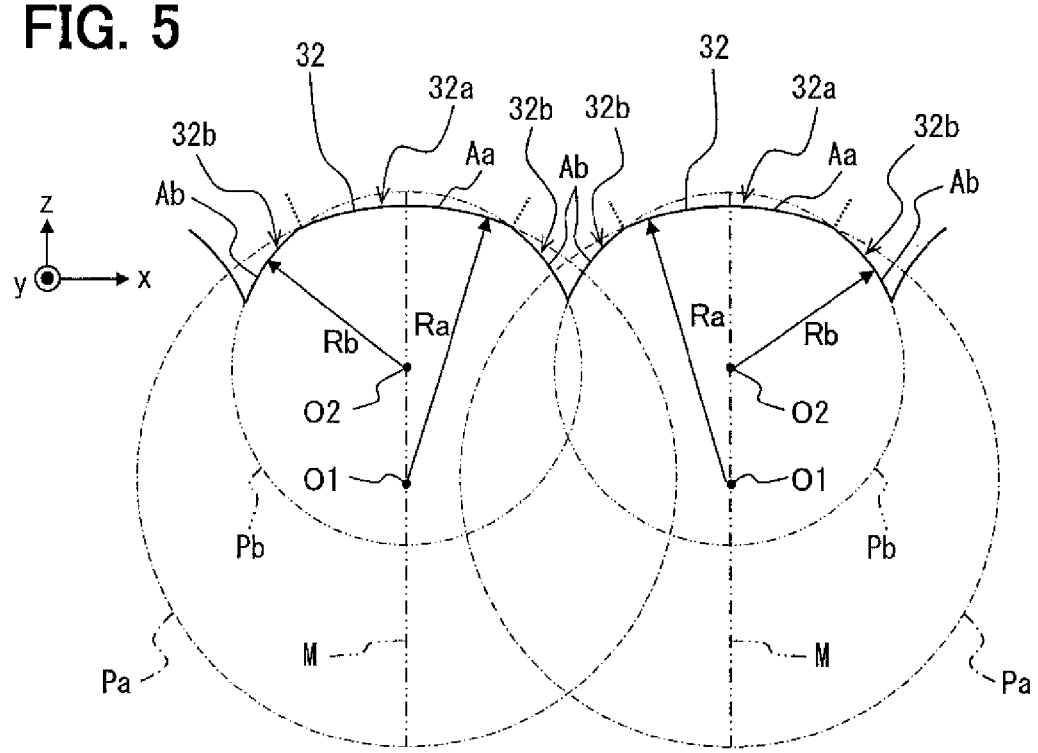
FIG. 5 is a partial longitudinal cross-sectional view of the screen member of the first embodiment taken along line V-V in FIG. 4 or FIG. 7.

The concave mirror 40 is formed through vapor deposition of, for example, aluminum on a surface of a substrate made of, for example, glass. The concave mirror 40 has a reflection surface 41 that reflects the reflected bundle of rays of light, which is reflected from the imaging surface 31 of the screen member 30, onto the projection surface 91 of the windshield 90. A center portion of the reflection surface 41 is concave, i.e., is curved and is recessed in a direction away from the imaging surface 31 and the projection surface 91. The reflection surface 41 projects the display image 71 on the projection surface 91 such that the reflection surface 41 enlarges and reflects the display image 71, which is reflected by the imaging surface 31, Next, characteristic features of the head-up display apparatus 100 of the first embodiment will be described. Each of the optical elements 32, which are formed on the imaging surface 31, has a convex surface that is convex, i.e., is curved and is protruded in the direction of the z-axis toward the laser scanner 10. The convex surface of the optical element 32 is configured as follows. With reference to FIG. 5, in a longitudinal cross section of each of the optical elements 32 taken along a line V-V in FIG. 4, i.e., along the x-axis, the convex surface of the optical element 32 has two types of arcs Aa, Ab that have a predetermined radius of curvature Ra and a predetermined radius of curvature Rb, respectively, which are different from each other. In contrast, with reference of FIG. 6, in a lateral cross section (widthwise cross section) of each of the optical elements 32 taken along a line VI-VI in FIG. 4, i.e., along the y-axis, the convex surface of the optical element 32 has only one type of arc Ac, which has a predetermined radius of curvature Rc. The surface structure of each optical element 32 will be described later in detail. Furthermore, in a plan view of the screen member 30, each optical element 32 is configured into an elongated rectangular form. With reference to FIG. 4, a length of the optical element 32 measured in the longitudinal direction thereof, i.e., in the direction of the x-axis is longer than a width of the optical element 32 measured in the lateral direction thereof, i.e., in the direction of the y-axis. The optical elements 32 are arranged in rows and columns in a grid pattern to form an array. With reference o FIGS. 2 and 4, a ratio between the length of the optical element 32 measured in the direction of the x-axis and the width of the optical element 32 measured in the direction of the y-axis is substantially the same as a ratio between a length of the box 60 (i.e., a sum of a length of the main eye box 60a and lengths of the sub-eye boxes 60b) measured in the direction of the x-axis (the horizontal direction) and a width of the box 60 (i.e., a width of each of the main eye box 60a and the sub-eye boxes 60b) measured in the direction of the y-axis (the vertical direction).

Figure 6:
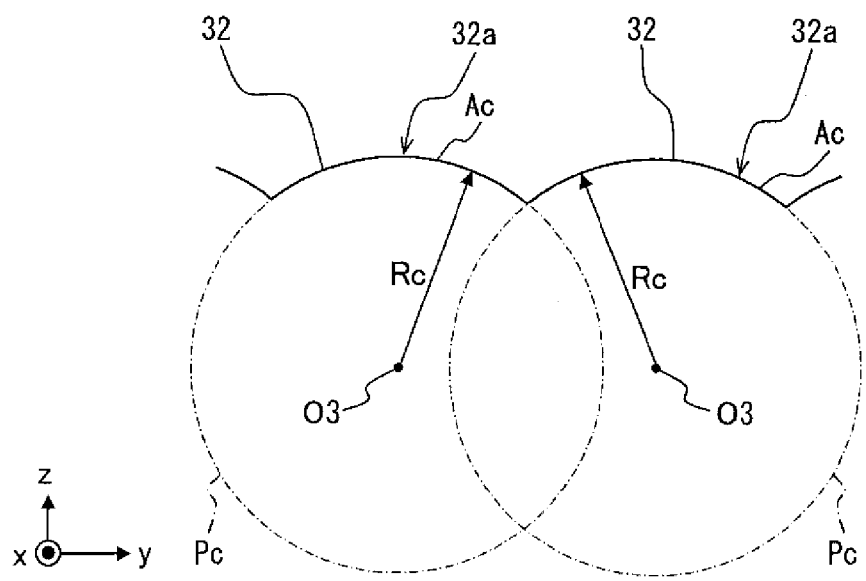
FIG. 6 is a partial lateral cross-sectional view of the screen member of the first embodiment taken along line VI-VI in FIG. 4 or FIG. 7.
Figure 7:
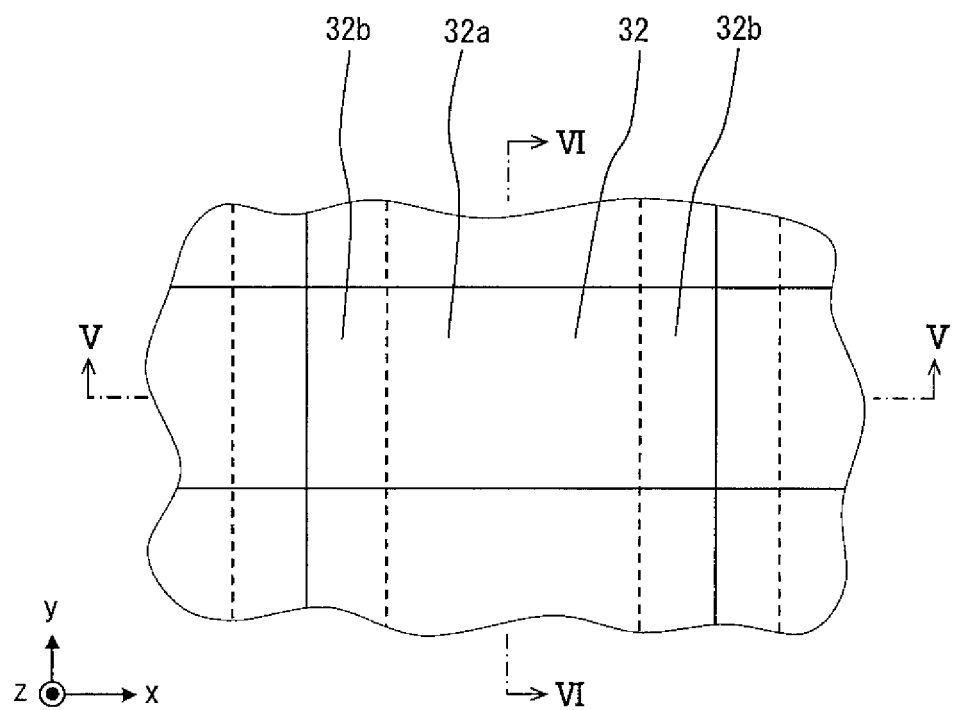
FIG. 7 is a partial plan view of the screen member of the first embodiment.

FIG. 5 shows the longitudinal cross section of the optical elements 32 in the column taken along line V-V, i.e., along the x-axis in FIGS. 4 and 7, i.e., is taken along an imaginary longitudinal line of the screen member 30 that extends along a widthwise center of each of the optical elements 32 in the column. FIG. 6 shows the lateral cross section of the optical elements 32 taken along line VI-VI, i.e., along the y-axis in FIGS. 4 and 7, i.e., is taken along an imaginary lateral line of the screen member 30 that extends along a longitudinal center of each of the optical elements 32 in the row. FIG. 7 is a partial plan view indicating a portion of the array of the optical elements 32 shown in FIG. 4. As shown in FIG. 7, a primary curved surface 32a and two secondary curved surfaces 32b are formed in the surface of each optical element 32. The primary curved surface 32a is formed in a center portion of the surface of the optical element 32. In the optical element 32, the secondary curved surfaces 32b are located on one side and the other side of the primary curved surface 32a in the direction of the x-axis. The primary curved surface 32a is a three-dimensionally curved surface that is formed by moving an apex of the arc Ac of FIG. 6 (see a solid arcuate line) along the arc Aa of FIG. 5 (see a solid arcuate line) in the direction of the x-axis in FIG. 5 upon rotating the plane of FIG. 6 by 90 degrees. The arc Ac of FIG. 6 arcuately extends as a part of an imaginary circle Pc about a center O3 and has the predetermined radius of curvature Rc. The arc Aa of FIG. 5 arcuately extends as a part of an imaginary circle Pa about a center O1 and has the predetermined radius of curvature Ra. Each of the secondary curved surfaces 32b is a three-dimensionally curved surface that is formed by moving the apex of the arc Ac of FIG. 6 along the arc Ab of FIG. 5 (see a solid arcuate line) in the direction of the x-axis in FIG. 5 upon rotating the plane of FIG. 6 by 90 degrees. The arc Ab of FIG. 5 extends as a part of an imaginary circle Pb about a center O2 and has the predetermined radius of curvature Rb. The radius of curvature Rb is smaller than the radius of curvature Ra (i.e., Rb<Ra). As shown in FIG. 5, in each of the optical elements 32, the arcs Ab of the two secondary curved surfaces 32b are both located along the common imaginary circle Pb, which is centered at the center O2. As shown in FIG. 7, in the optical element 32, there is no secondary curved surface 32b on either side of the primary curved surface 32a in the direction of the y-axis. Furthermore, in the longitudinal cross section of the optical element 32 shown FIG. 5, the center O1 of the arc Aa and the center O2 of the arc Ab are spaced from each other and are located along an imaginary line M, which extends in the direction of the z-axis.

When each of the optical elements 32 is configured in the above described manner, the following advantages can be achieved. Now, these advantages will be described in detail with reference to FIGS. 8 and 9.

Figure 8:
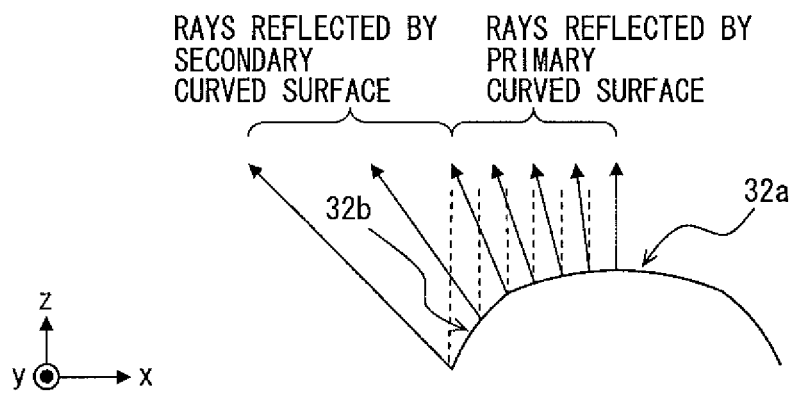
FIG. 8 is a diagram showing a bundle of rays of light, which is incident on one of optical elements of the screen member, and rays of the diffused light, which is diffused by the optical element according to the first embodiment.

As shown in FIG. 8, when the bundle of rays of light outputted from the laser scanner 10 in the z-direction is incident on the optical element 32, the optical element 32 diffuses the bundle of rays of light at corresponding angles of diffusion, which correspond to the primary and secondary curved surfaces 32a, 32b of the optical element 32. Specifically, the angle of diffusion of the bundle of rays of light, which is incident on the primary curved surface 32a, is smaller than the angle of diffusion of the bundle of rays of light, which is incident on the secondary curved surface 32b. This is because of that the radius of curvature Ra of the primary curved surface 32a is larger than the radius of curvature Rb of the secondary curved surface 32b. In this way, the angle of bundle of rays of light, which is reflected by the primary curved surface 32a, relative the direction of the z-axis becomes smaller than the angle of bundle of rays of light, which is reflected by the secondary curved surface 32b, relative to the direction of the z-axis. Thereby, as shown in FIG. 8, a density of rays of the reflected light, which is reflected by the primary curved surface 32a, becomes higher than a density of rays of the reflected light, which is reflected by the secondary curved surface 32b. Since the primary curved surface 32a and the secondary curved surface 32b have the common radius of curvature Rc in the direction of the y-axis, the angle of diffusion of the bundle of rays in the direction of the y-axis is the same in both of the primary curved surface 32a and the secondary curved surface 32b.

Thereby, the bundle of rays of light, which is incident on the primary curved surface 32a, is diffused at the corresponding angle of diffusion, which corresponds to the surface contour of the primary curved surface 32a, and this diffused bundle of rays is transmitted to the concave mirror 40. Then, this bundle of rays of light, which is reflected by the concave mirror 40, is reflected by the projection surface 91 of the windshield 90 and is guided to the main eye box 60a. In contrast, the bundle of rays of light, which is incident on the corresponding one of the two secondary curved surfaces 32b located on the opposite sides, respectively of the primary curves surface 32a, is diffused at the corresponding angle of diffusion, which corresponds to the surface contour of the secondary curved surface 32b, and this diffused bundle of rays is transmitted to the concave mirror 40. Then, this bundle of rays of light, which is reflected by the concave mirror 40, is reflected by the projection surface 91 of the windshield 90 and is guided to the corresponding one of the two sub-eye boxes 60b, which are located on the two opposite sides, respectively, of the main eye box 60a in the direction of the x-axis (the horizontal direction).

Figure 9:
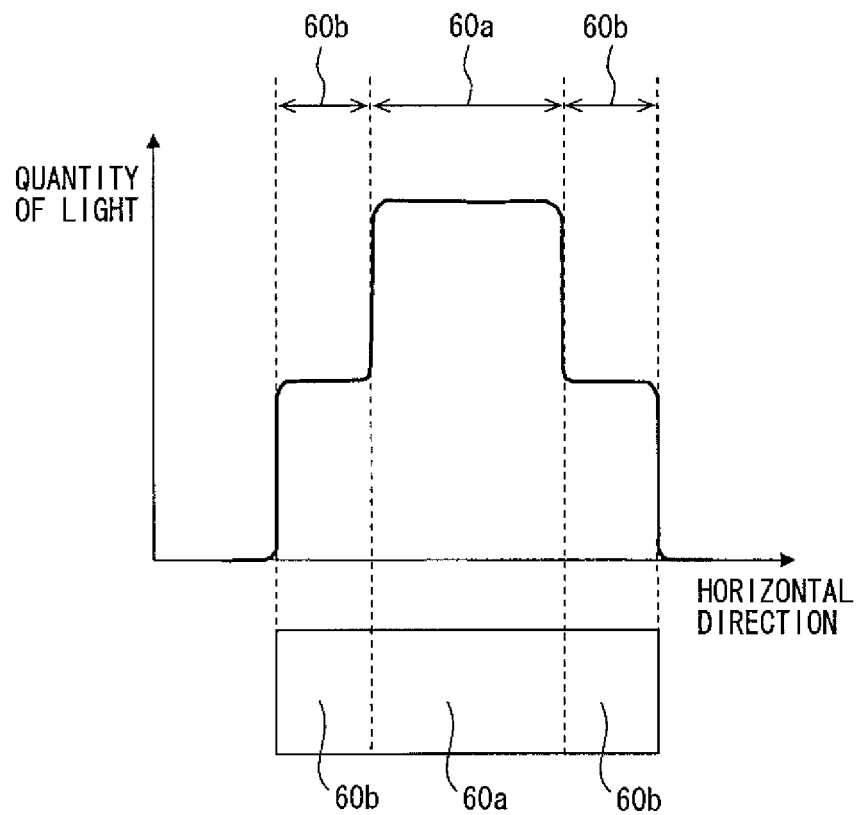
FIG. 9 is a diagram showing a relationship between a quantity of light and a horizontal position in a main eye box and two sub-eye boxes according to the first embodiment.

As discussed above, the angle of diffusion of the bundle of rays of the reflected light, which is reflected by the primary curved surface 32a, becomes smaller than the angle of diffusion of the bundle of rays of the reflected light, which is reflected by the secondary curved surface 32b. Therefore, the density of the rays of the reflected light, which is reflected by the primary curved surface 32a, becomes higher than the density of the rays of the reflected light, which is reflected by the secondary curved surface 32b. A quantity of light (also referred to as a luminous energy), which is guided to the corresponding one of the main eye box 60a and the sub-eye boxes 60b, is proportional to the density of the rays of light guided thereto. Therefore, as shown in FIG. 9, the quantity of light at the main eye box 60a becomes larger than the quantity of light at each of the sub-eye box 60b. As a result, the brightness of the virtual image 70 of the display image 71 in the main eye box 60a can be set to be higher than the brightness of the virtual image 70 of the display image in the sub-eye box 60b. Therefore, it is possible to increase the brightness of the virtual image 70 in the main eye box 60a in comparison to that of the virtual image 70 in the respective sub-eye boxes 60b. Furthermore, the quantity of light in the sub-eye box 60b becomes smaller than the quantity of light in the main eye box 60a. Therefore, the viewer can visually recognize the virtual image 70 without excessively increasing the brightness of the virtual image 70 at the sub-eye box 60b. Furthermore, the quantity of light in each sub-eye box 60b is not excessively increased. Therefore, it is possible to limit the excessive supply of the energy of the rays of light from the laser scanner 10 to the sub-eye box 60b. As a result, it is possible to limit a reduction in the use efficiency of the light.

The length of each optical element 32 in the direction of the x-axis and the width of the optical element 32 in the direction of the y-axis as well as the ratio therebetween are determined based on the size of the main eye box 60a and the size of each sub-eye box 60b to be set. Furthermore, the size of the main eye box 60a and the size of each sub-eye box 60b vary depending on the radius of curvature Ra and the radius of curvature Rb. Therefore, the radius of curvatures Ra and the radius of curvature Rb should be considered at the time of setting the main eye box 60a and the sub-eye boxes 60b. This is because of that the angle of diffusion of the rays of light varies depending on the radius of curvature, as discussed above, to cause a change in a range (size) of the rays of light to be guided at this angle of diffusion.

As discussed above, the bundle of rays of light reflected by the primary curved surface 32a is guided to the main eye box 60a, and the bundle of rays of light reflected by the corresponding secondary curved surface 32b is guided to the corresponding sub-eye box 60b. In the present embodiment, the secondary curved surfaces 32b are symmetrically provided on the opposite sides, respectively, of the primary curved surface 32a. Therefore, the sub-eye boxes 60b are symmetrically provided on the opposite sides, respectively, of the main eye box 60a. Here, it should be noted that the secondary curved surfaces 32b may possibly be asymmetrically provided on the opposite sides, respectively, of the primary curved surface 32a to asymmetrically provide the sub-eye boxes 60b on the opposite sides, respectively, of the main eye box 60a, if desired.

In the case where the main eye box 60a and the sub-eye boxes 60b are arranged in the above-described manner, even when the eye point 61 of the viewer is displaced from the main eye box 60a due to the movement of the upper half of the body of the viewer during the maneuvering of the vehicle, the eye point 61 can be still kept in one of the sub-eye boxes 60b located on the opposite sides, respectively, of the main eye box 60a, so that the viewer can more reliably view the virtual image 70 of the display image 71.

The viewer is seated on the driver's seat at the time of driving the vehicle. Therefore, the head of the viewer seated on the driver's seat tends to move in the horizontal direction of the vehicle rather than the vertical direction of the vehicle. Therefore, the eye point 61 tends to move in the horizontal direction.

Particularly, in the present embodiment, the two secondary curved surfaces 32b are formed on the two opposite sides, respectively, of the primary curved surface 32a in the direction of the x-axis (the horizontal direction) to form the two sub-eye boxes 60b on the two opposite sides, respectively, of the main eye box 60a in the direction of the x-axis (the horizontal direction). Thereby, the sub-eye boxes 60b and the main eye box 60a can be placed to correspond with the movement of the head of the viewer (the movement of the eye point 61). As a result, the visibility of the virtual image 70 of the display image 71 can be improved.

In the present embodiment, the laser scanner 10 serves as a projector. The main eye box 60a serves as a main-viewing range. Each of the sub-eye boxes 60b serves as a sub-viewing range.

(Second Embodiment)

In the first embodiment, the two secondary curved surfaces 32b are provided at the two opposite sides, respectively, of the primary curved surface 32a. In the case where the primary curved surface 32a and the secondary curved surfaces 32b are formed in the above-described manner, when the eye point 61 is displaced from the main eye box 60a and is placed in the sub-eye box 60b, the quantity of light is rapidly changed, and thereby the brightness of the virtual image 70 is rapidly decreased, as shown in FIG. 9. Thus, the viewer may possibly have an uncomfortable feeling with respect to the rapid change of the brightness.

Figure 10:
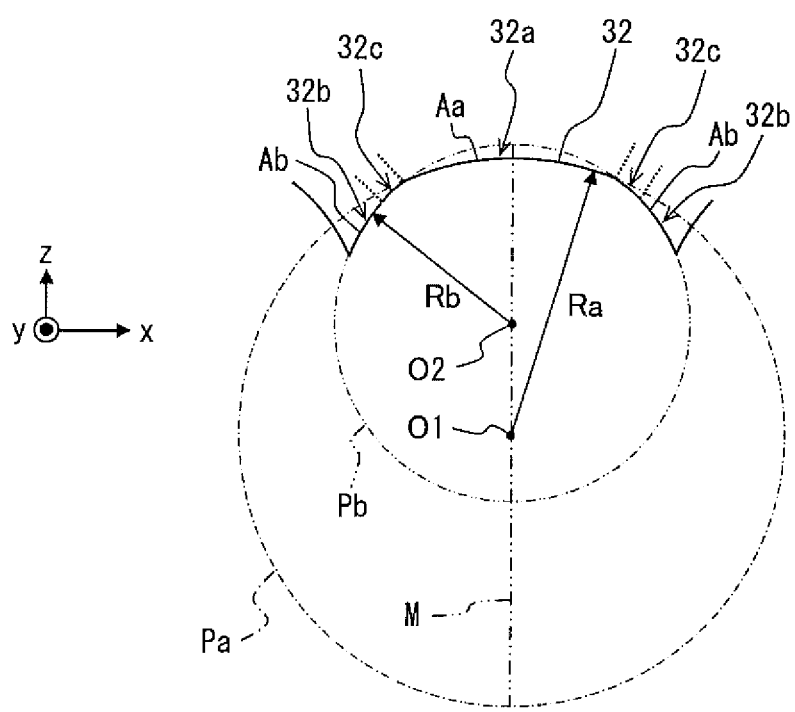
FIG. 10 is a partial longitudinal cross-sectional view of a screen member of a second embodiment of the present disclosure taken along line V-V in FIG. 4 or FIG. 7.

Thus, in the second embodiment, as shown in FIG. 10, a connecting surface (also referred to as a transition surface) 32c is formed as a curved surface between the primary curved surface 32a and each of the secondary curved surface 32b along the x-axis. In the longitudinal cross section of the optical element 32 taken along the x-axis (i.e., the cross section taken along the line V-V in FIG. 4), a radius of curvature of the connecting surface 32c is progressively changed from the radius of curvature Ra to the radius of curvature Rb from one side of the connecting surface 32c, at which the primary curved surface 32a is located, to the other side of the connecting surface 32c, at which the secondary curved surface 32b is located, in the direction of the x-axis. Furthermore, in the lateral cross section of the optical element 32 (i.e., the cross section taken along line VI-VI in FIG. 4), a radius of curvature of the connecting surface 32c is set to be the radius of curvature Rc like in the first embodiment. Specifically, in the lateral cross section of the optical element 32 taken along the y-axis, the convex surface of the optical element 32 has only one type of arc Ac, like in the first embodiment (see FIG. 6).

Figure 11:
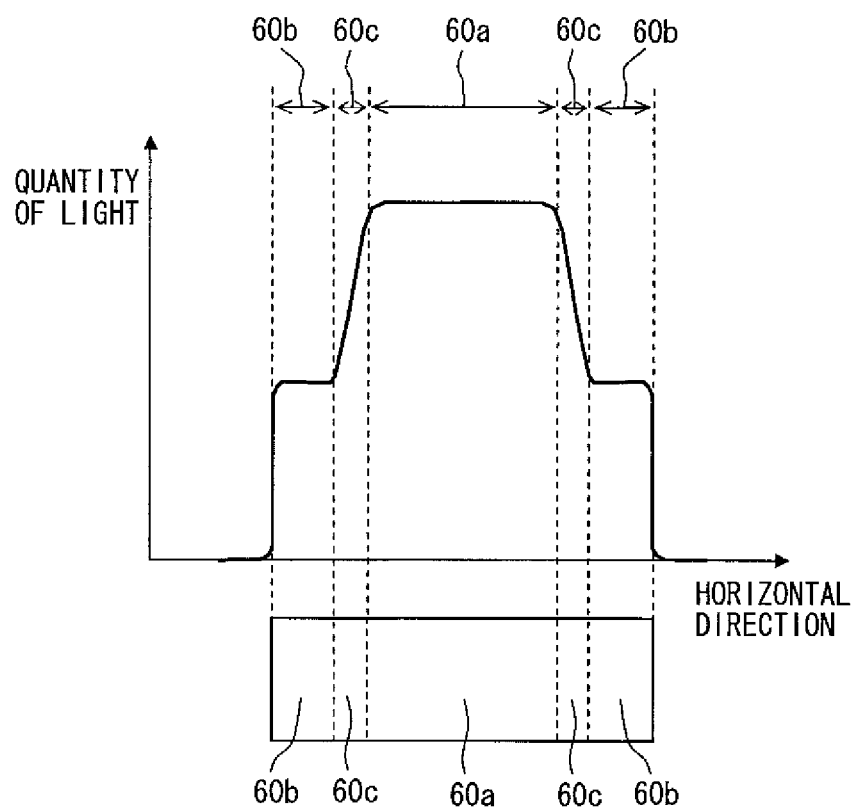
FIG. 11 is a diagram showing a relationship between a quantity of light and a horizontal position in a main eye box and two sub-eye boxes according to the second embodiment.

In this way, as shown in FIG. 11, a connecting eye box (transition eye box) 60c is formed between the main eye box 60a and each sub-eye box 60b. The quantity of light, which is supplied to the connecting eye box 60c, is progressively reduced from the main eye box 60a side to the sub-eye box 60b side. Therefore, the brightness of the virtual image 70 of the display image 71 is progressively reduced from the main eye box 60a side to the sub-eye box 60b side. As a result, it is possible to alleviate the uncomfortable feeling of the viewer, which is caused by the rapid change in the brightness.

The present disclosure has been described with respect to the first and second embodiments. However, the present disclosure is not limited to the above embodiments, and the above embodiments may be modified within a spirit and scope of the present disclosure.

In the first and second embodiments, the primary curved surface 32a and the secondary curved surfaces 32b are arranged in the horizontal direction, i.e., in the direction of the x-axis in each of the optical elements 32 of the screen member 30 to form the main eye box 60a and the sub-eye boxes 60b arranged in the horizontal direction, i.e., in the direction of the x-axis. This arrangement of the primary curved surface 32a and the secondary curved surfaces 32b is due to the arrangement of the main eye box 60a and the sub-eye boxes 60b in the horizontal direction. For example, in a case where the main eye box 60a and the sub-eye boxes 60b need to be arranged in the vertical direction, i.e., the direction of the y-axis, the primary curved surface 32a and the secondary curved surfaces 32b may be arranged in the vertical direction, i.e., in the direction of the y-axis such that the secondary curved surfaces 32b are placed at two opposite sides, respectively, of the primary curved surface 32a in the direction of the y-axis. Furthermore, in a case where the sub-eye boxes 60b (e.g., three or more sub-eye boxes 60b) need to be arranged to surround the main eye box 60a, the secondary curved surfaces 32b (e.g., three or more secondary curved surfaces 32b) may be arranged to surround the primary curved surface 32a.

Furthermore, in the first and second embodiments, each of the optical elements 32 is configured into the elongated rectangular form, and these optical elements 32 are arranged in the rows and columns in the grid pattern to form the screen member 30. However, the shape of each of the optical elements 32 is not limited to the rectangular form. For example, the shape of each of the optical elements 32 may be a hexagonal form, and these optical elements 32 may be densely arranged in a honeycomb pattern to form the screen member. When each of the optical elements is configured into the hexagonal form, the entire box, which includes the main eye box and the sub-eye boxes, becomes a hexagonal form.

Figure 12:
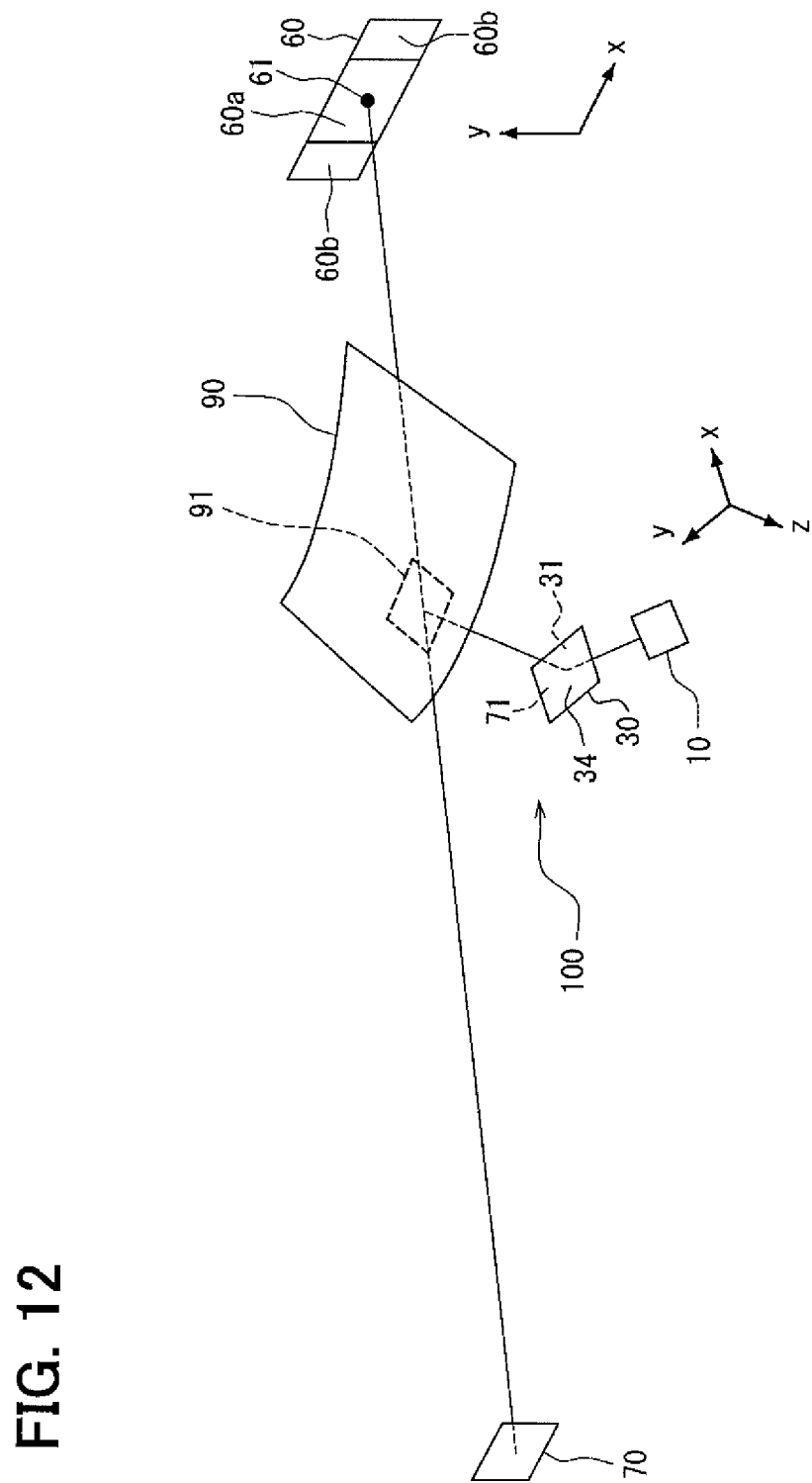
FIG. 12 is a diagram showing an arrangement of the head-up display apparatus in a modification of the first embodiment in the vehicle.

In the first and second embodiments, the bundle of rays of light is indirectly projected from the screen member 30 to the projection surface 91 of the windshield 90 through the concave mirror 40. Alternatively, as shown in FIG. 12, the concave mirror 40 may be eliminated, and the bundle of rays of light may be directly projected from the screen member 30 to the projection surface 91 of the windshield 90. In FIG. 12, the imaging surface 31 of the screen member 30 is directed to the projection surface 91 of the windshield 90 to directly reflect the bundle of rays of light, which is received from the laser scanner 10, to the projection surface 91 of the windshield 90.

Figure 13:
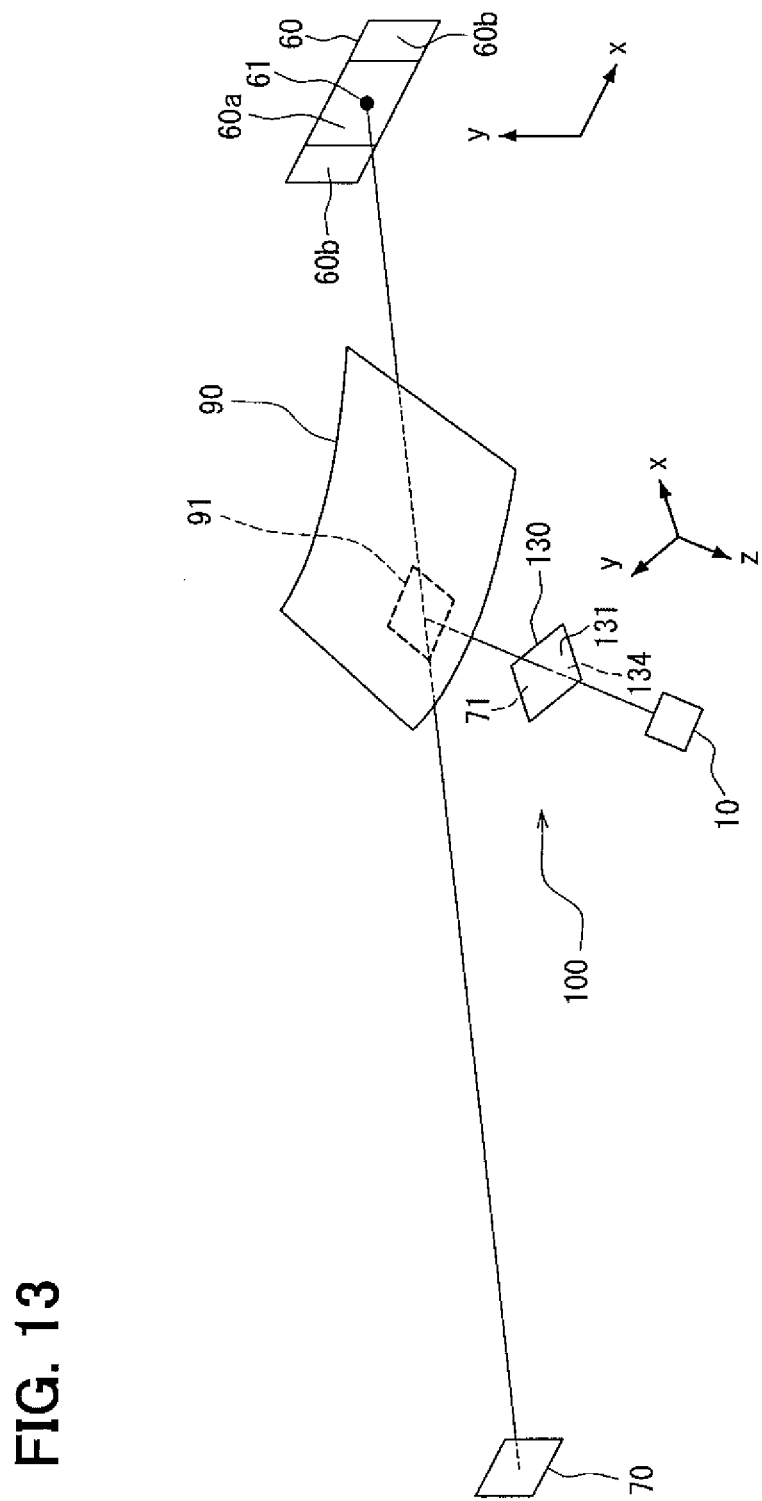
FIG. 13 is a diagram showing an arrangement of the head-up display apparatus in another modification of the first embodiment in the vehicle.

Furthermore, as shown in FIG. 13, the reflective screen member 30 may be replaced with a transmission screen member 130, which is made of a light transmissive material. A configuration of the transmission screen member 130 is similar to that of the reflective screen member 30 shown in FIG. 4. Specifically, as shown in FIG. 4, the transmission screen member 130 includes a plurality of optical elements 132, which are formed as micro-lenses (an array of micro-lenses) at an arrayed surface 131 of the transmission screen member 130. In this instance, the bundle of rays of light, which is projected from the laser scanner 10, enters the screen member 130 from a flat surface 134 of the screen member 130 (the lower side of the screen member 130 in FIG. 4) and is transmitted through the screen member 130. Then, the bundle of rays of light, which is transmitted through the screen member 130, is diffused and outputted from the arrayed surface 131 of the screen member 130 (the upper side of the screen member 130 in FIG. 4) through the corresponding optical element 132. Each of the optical elements 132 has the primary curved surface 32a and the two secondary curved surfaces 32b, which are similar to those of the optical element 32 of the reflective screen member 30 discussed in the first embodiment except that the primary curved surface 32a and the two secondary curved surfaces 32b of the optical element 132 are not reflective surfaces coated with the aluminum film but are transmissive surfaces with no aluminum film or the like. The bundle of rays of light, which is outputted from the optical element 132, is directly projected to the projection surface 91 of the windshield 90. Also, it should be noted that the orientation of the screen member 130 shown in FIG. 4 may be flipped, i.e., rotated by 180 degrees to enter the bundle of rays of light, which is projected from the laser scanner 10, into the primary curved surface 32a and the secondary curved surface 32b of the optical element 132 formed in the arrayed surface 131 of the screen member 130. In such a case, the bundle of rays of light is projected from the screen member 130 toward the projection surface 91 of the windshield 90 from the flat surface 134 of the screen member 130. Even with these modifications using the screen member 130, the advantages similar to those discussed in the first embodiment can be achieved. Also, each optical element 132 of the screen member 130 may have the connecting surfaces 32c of the second embodiment to achieve the advantage similar to that of the second embodiment.

Furthermore, the modification of FIG. 13 may be further modified such that the concave mirror 40 of the first or second embodiment is placed between the screen member 130 and the projection surface 91 of the windshield 90 in a manner similar to that of the first embodiment shown in FIG. 3 to indirectly project the bundle of rays of light from the screen member 130 to the projection surface 91 of the windshield 90 through the concave mirror 40.

The optical elements 32, 132 discussed in the above embodiments and modifications thereof may serve as a means for diffusing the bundle of rays of light.

In the first and second embodiments, there is used the MENS device 26 that includes the horizontal scanner 27, which scans the laser light in the horizontal direction, and the vertical scanner 28, which scans the laser light in the vertical direction. The MEMS device may be modified to have a single reflective member and two shafts (pivots). The single reflective member reflects the laser light projected from the optical device, and the two shafts extend in the horizontal direction and the vertical direction, respectively. The reflective member is driven in the vertical direction and the horizontal direction about these shafts to form the two-dimensional display image.

In the first and second embodiments, the windshield 90 is used as the display member, onto which the display image 71 is projected from the head-up display apparatus 100. However, the display member, on which the projection surface is formed, is not limited to the windshield 90. For example, the display member may be a combiner (separate member) having a projection surface. This combiner is made of a light transmissive material and is placed adjacent to, more specifically attached to the interior surface of the windshield 90 located inside of the passenger compartment of the vehicle. Furthermore, the combiner may be formed separately or provided separately from the windshield 90.

In the first and second embodiments, the laser scanner 10, which forms the display image 71 on the imaging surface 31 through the scanning of the laser light, is used as the projector. However, various other types of projectors may be used as the projector of the present disclosure as long as such a projector can project the light, which forms the display image on the imaging surface. Specifically, for example, a projector, which includes a liquid crystal on silicon (LCOS) or a digital mirror device (DMD) together with a light source and an optical system (e.g., a lens(es)), may be used as a the projector of the present disclosure.

The LCOS is formed by holding a liquid crystal layer between a silicon substrate and a light transmissive substrate. The liquid crystal layer forms a plurality of arrayed pixels. A circuit, which drives the liquid crystal, and an electrode, which reflects the light, are provided in the silicon substrate. The light of the light source, which enters the LCOS through the light transmissive substrate, passes through the liquid crystal layer and is reflected by the electrode provided in the silicon substrate, so that the reflected light exits the LCOS. When an original image, which later becomes the display image, is formed in the liquid crystal layer, the projector having such an LCOS can project the light that forms the display image on the imaging surface.

The DMD is formed by arraying a large number of micro-mirrors on a substrate. Each of the micro-mirrors forms a corresponding pixel. A tilt angle of each micro-mirror can be changed based on a control signal. The light of the light source, which enters the DMD, is reflected by each micro-mirror. The DMD can form the image by controlling the tilt angle of each of the micro-mirrors. Thus, the projector, which has the DMD, can project the light, which forms the display image on the imaging surface.

In the first and second embodiments, the present disclosure is applied to the head-up display apparatus, which projects the display image 71 onto the windshield 90 of the vehicle (e.g., the automobile). However, the present disclosure can be applied to various types of head-up displays, which are adapted to be installed in various other types of transportation apparatuses (e.g., other types of vehicles, such as airplanes, ships, trains) and to enable a viewer to view the virtual image 70 of the display image 71.

Additional advantages and modifications will readily occur to those skilled in the art. The present disclosure in its broader terms is therefore not limited to the specific details, representative apparatus, and illustrative examples shown and described.

What is claimed is:

1. A head-up display apparatus that is configured to project a display image onto a projection surface of a display member, which is installed in a vehicle, to enable a viewer located in a vehicle cabin of the vehicle to view a virtual image of the display image, the head-up display apparatus comprising:
   a projector that is configured to project a bundle of rays of light, which forms the display image; and
   a screen member, onto which the bundle of rays of light is projected from the projector, wherein the screen member diffuses the bundle of rays of light, which is projected from the projector, at a predetermined angle of diffusion directly or indirectly toward the display member to guide the bundle of rays of light to both of a main-viewing range and at least one sub-viewing range, which are preset and in each of which the virtual image is visually recognizable by the viewer, wherein:
   the screen member has a plurality of optical elements, each of which includes a primary curved surface and at least one secondary curved surface;
   the primary curved surface of each of the plurality of optical elements diffuses the bundle of rays of light toward the main-viewing range through the display member;
   the at least one secondary curved surface of each of the plurality of optical elements diffuses the bundle of rays of light toward the at least one sub-viewing range through the display member; and
   a radius of curvature of the primary curved surface of each of the plurality of optical elements is larger than a radius of curvature of the at least one secondary curved surface of the optical element.

2. The head-up display apparatus according to claim 1, wherein the at least one secondary curved surface of each of the plurality of optical elements includes two secondary curved surfaces, which are arranged on two opposite sides, respectively, of the primary curved surface of the optical element.

3. The head-up display apparatus according to claim 1, wherein:
   the main-viewing range and the at least one sub-viewing range are arranged one after another in a lateral direction of the vehicle; and
   the primary curved surface and the at least one secondary curved surface are arranged one after another in a predetermined direction to correspond with the main-viewing range and the at least one sub-viewing range, respectively.

4. The head-up display apparatus according to claim 1, wherein:
   each of the plurality of optical elements includes at least one connecting surface that is formed as a curved surface and is placed between the primary curves surface and the at least one secondary curved surface of the optical element; and
   a radius of curvature of the at least one connecting surface of each of the plurality of optical elements is progressively changed from the radius of curvature of the primary curved surface of the optical element to the radius of curvature of the at least one secondary curved surface of the optical element from one side of the at least one connecting surface, at which the primary curved surface of the optical element is located, to the other side of the at least one connecting surface, at which the at least one secondary curved surface of the optical element is located.

5. The head-up display apparatus according to claim 1, wherein the plurality of optical elements is a plurality of micro-mirrors or a plurality of micro-lenses.

* * * * *

UNITED STATES PATENT AND TRADEMARK OFFICE
CERTIFICATE OF CORRECTION

PATENT NO. : 8,760,766 B2  Page 1 of 1
APPLICATION NO. : 13/593600
DATED : June 24, 2014
INVENTOR(S) : Fujikawa It is certified that error appears in the above-identified patent and that said Letters Patent is hereby corrected as shown below:

On the Title Page, Item [73]

"Denson Corporation" should be -- Denso Corporation --

Signed and Sealed this
Second Day of September, 2014

Michelle K. Lee
*Deputy Director of the United States Patent and Trademark Office*